APPARATUS TO INDEX AND CLAMP ELECTROTYPE PLATES FOR PUNCHING

Filed Jan. 20, 1958 4 Sheets-Sheet 1

INVENTOR.
George P. Boule,
BY
Schroeder, Hofgren, Brady & Wegner
Attys.

APPARATUS TO INDEX AND CLAMP ELECTROTYPE PLATES FOR PUNCHING

Filed Jan. 20, 1958 4 Sheets-Sheet 2

INVENTOR.
George P. Boule
By Schroeder, Hofgren, Brady & Wegner
Attys.

July 10, 1962 G. P. BOULE 3,043,586

APPARATUS TO INDEX AND CLAMP ELECTROTYPE PLATES FOR PUNCHING

Filed Jan. 20, 1958 4 Sheets-Sheet 3

INVENTOR.
George P. Boule,
BY
Schroeder, Hofgren, Brady & Wagner
Atty's.

July 10, 1962 G. P. BOULE 3,043,586

APPARATUS TO INDEX AND CLAMP ELECTROTYPE PLATES FOR PUNCHING

Filed Jan. 20, 1958 4 Sheets-Sheet 4

INVENTOR.
George P. Boule,
BY
Schroeder, Hofgren, Brady & Wegner
Att'ys.

United States Patent Office 3,043,586
Patented July 10, 1962

3,043,586

APPARATUS TO INDEX AND CLAMP ELECTROTYPE PLATES FOR PUNCHING

George P. Boule, Chicago, Ill., assignor to R. R. Donnelley & Sons Company, a corporation of Delaware
Filed Jan. 20, 1958, Ser. No. 710,088
10 Claims. (Cl. 269—49)

This invention relates to a device to index and clamp electrotype plates in connection with punching precisely located machining holes in the plates in order to simplify the problem of obtaining perfect register between the plates of a color set.

A very difficult part of high grade color printing is to obtain precise register between the plates of a multi-color set. Final register is obtained by adjusting the plates on the plate cylinders of the printing press before a press run is started; and it is obvious that whatever can be done to simplify the alignment and register of the plates on the plate cylinder is very beneficial in reducing make ready time so as to permit the greatest utilization of the printing presses.

The device of the present invention is so arranged that it may utilize indexing recesses molded into the printing plates in order to punch a pair of holes in each plate of a color set by means of which the plates may be secured in a milling machine or other suitable machine tool for final trimming of the plate margins to predetermined dimensions, and for formation in the undersides of the plates of locking and drive recesses.

There are various techniques for producing indexing marks on the engravings from which molds for printing plates are cast. What ever technique may be used, the end result is that each engraving of a color set has indexing marks which bear a predetermined relationship to the final transverse and longitudinal borders of the finished printing plates which will be cast in the molds made on the engravings. In the present instance, the engravings are provided with recesses, or dimples which are precisely located with reference to the so-called trim lines of the plates—the trim lines being the lines to which the finished plates are trimmed to form their longitudinal and transverse margins. Such recesses, or dimples, of course appear as protuberances in the molds made from the engravings, and ultimately produce precisely positioned recesses in the printing plates. These recesses may be in portions of the plates which are removed in the final trimming.

The principal object of the present invention is to provide a machine which permits holes to be rapidly and accurately punched in the printing plates of a multicolor set, in order that the final trimming and finishing of the plates may provide very exact register between the material on the plates of the set.

Another object of the invention is to provide a machine which permits easy manual location of a printing plate in an exact location on a table.

Yet another object of the invention is to provide a machine which, once a plate is precisely positioned on a table, may be started so as to sequentially clamp the plate to the table, punch the plate, and unclamp it without further attention on the part of the operator.

The invention is illustrated in a preferred embodiment in the accompanying drawings, in which.

Figure 1:
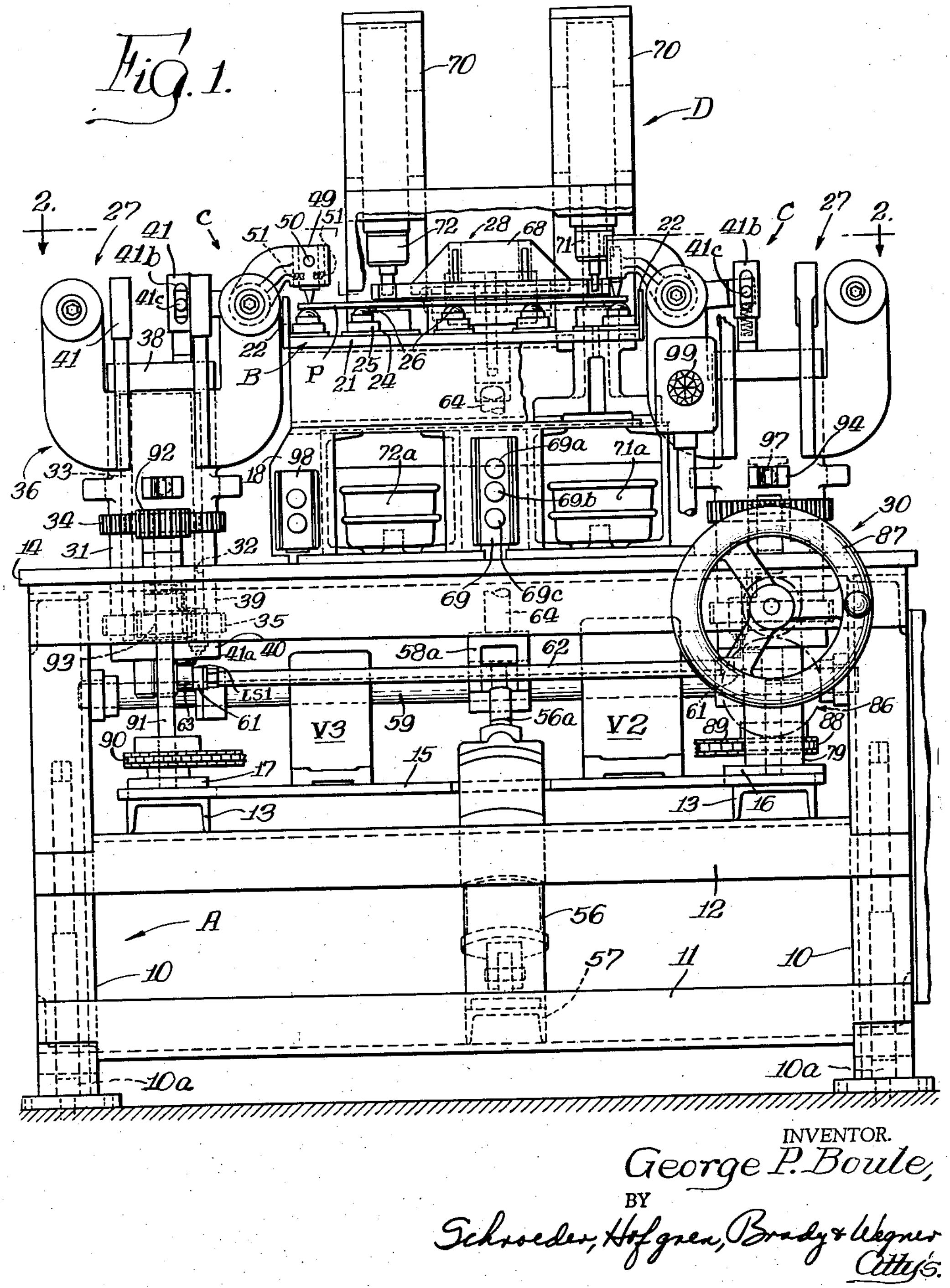
FIG. 1 is a front elevational view of the machine with parts removed for clarity of illustration.
Figure 2:
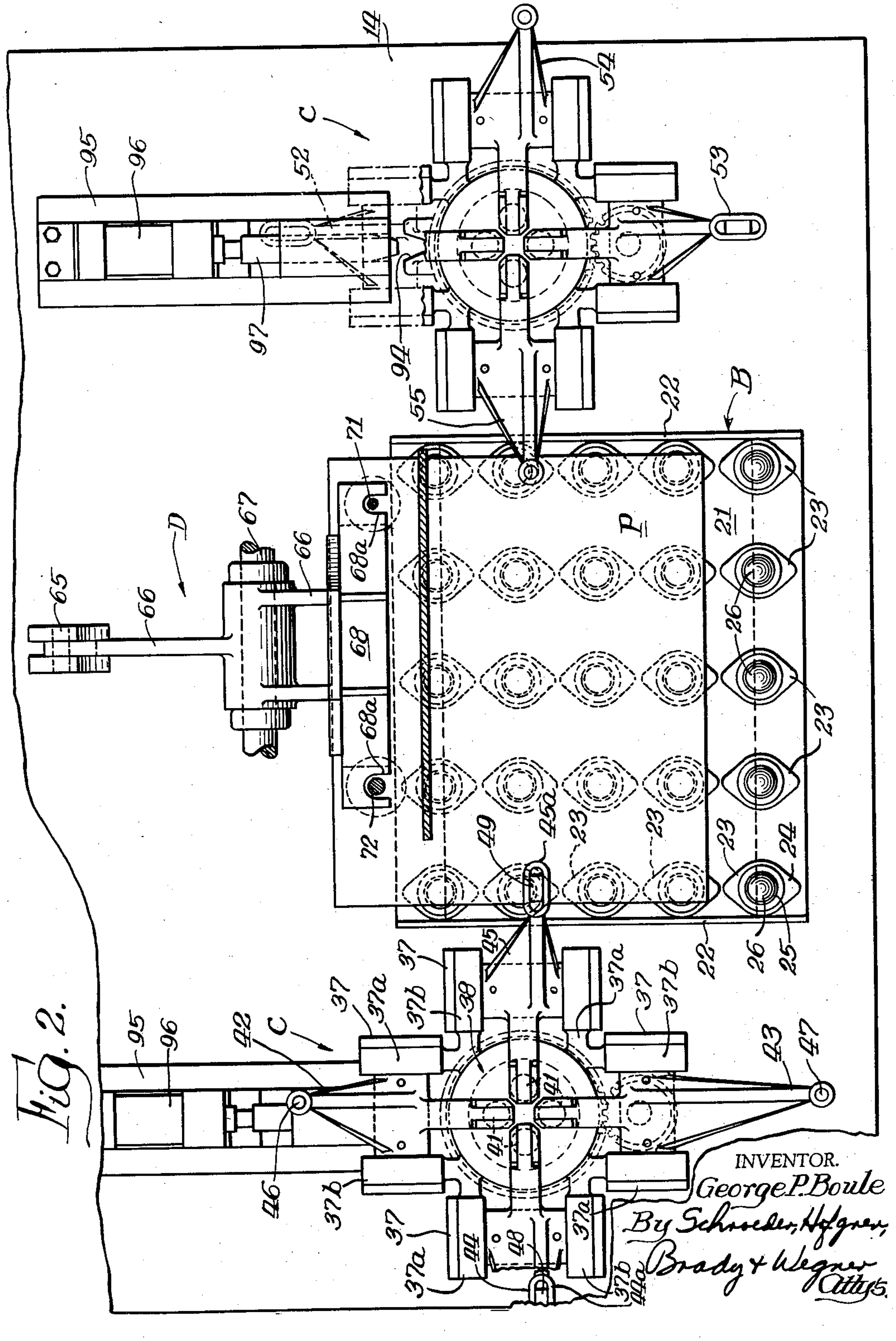
FIG. 2 is a fragmentary section taken substantially as illustrated along the line 2—2 of FIG. 1.
Figure 3:
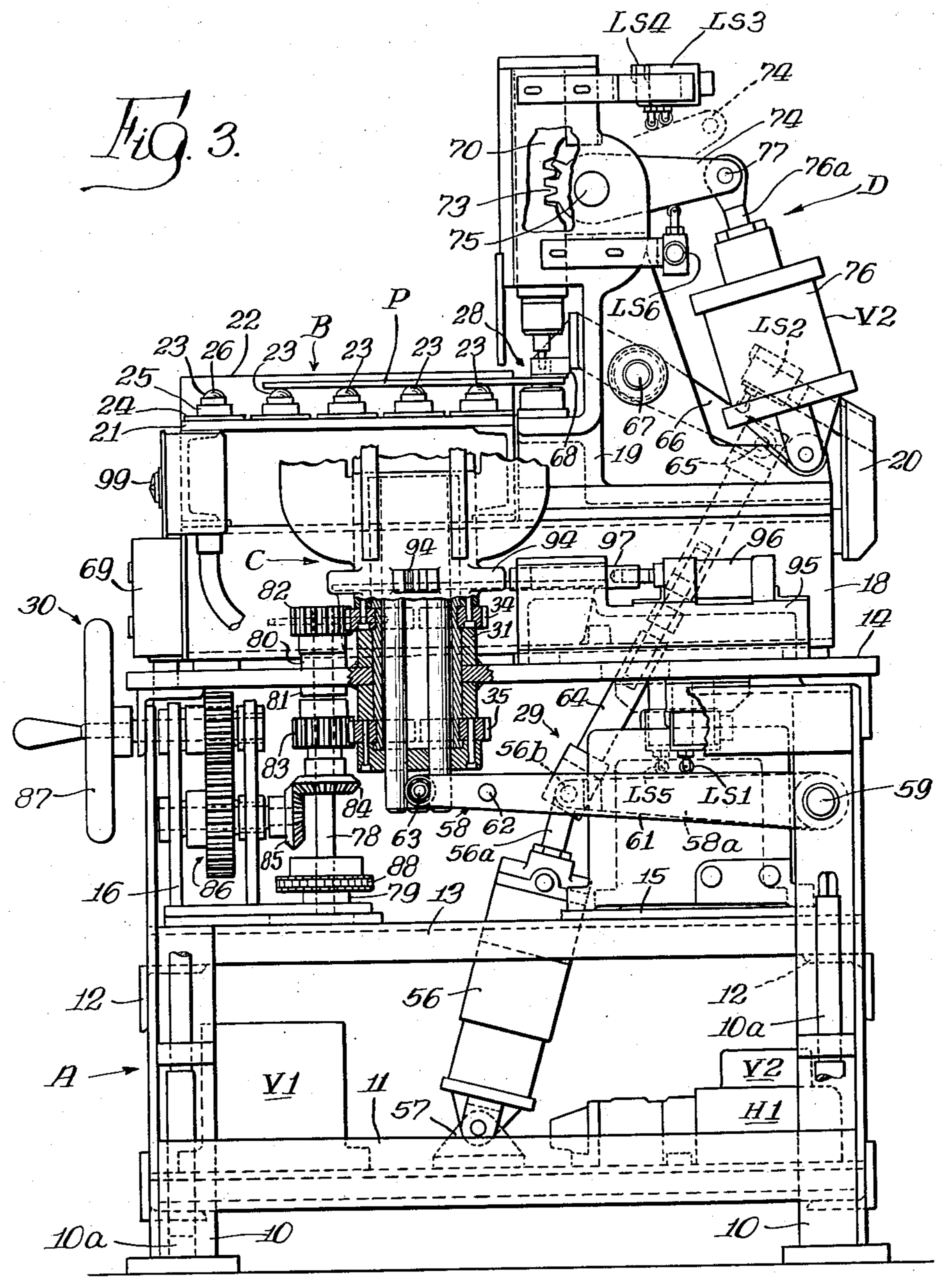
FIG. 3 is an end elevation, viewing FIG. 1 from the right, with parts broken away.

Referring to the drawings generally, and referring first to FIGS. 1 to 3, the device of the present invention consists generally of a base frame A, a plate table B, indexing and clamping mechanism C, punching mechanism D, and suitable electric controls for the air cylinders which power the indexing-clamping mechanism C and the punching mechanism D.

Referring to the drawings in greater detail, and referring first to FIGS. 1 and 3, the base frame A has a plurality of supporting legs 10 between which are a bottom shelf panel 11, intermediate bracing members 12 and supporting beams 13, and a top plate 14. Mounted on the supporting beams 13 is a valve supporting member 15 which is at the rear of the base frame A as seen in FIG. 3, while at the front of the base frame are supporting brackets 16 and 17 for a hand crank mechanism which is used for adjusting certain parts of the indexing-clamping mechanism C. Surmounting top plate 14 is a box frame 18 at the front of which is the plate table B and at the rear of which are brackets 19 and 20 for another part of the indexing-clamping mechanism C and for the punch mechanism D. The supporting legs 10 are adjustable to vary the height of the top plate 14 by means of conventional jack screws **10*a***.

The plate table B is seen in FIGS. 1 to 3 to include a base plate 21 at the ends of which are upright side plates 22, and between the side plates is a plurality of ball assemblies 23, the illustrated embodiment having 25 such assemblies in five rows of five each. As best seen in FIGS. 2 and 3, each of the ball assemblies includes a mounting bracket 24 on which is an upstanding cup 25 containing a universally rotatable ball 26. The tops of all the balls 26 are coplanar, so that they provide a horizontal rolling support for an electrotype plate P. Thus, when a plate P is placed upon the plate table B it is supported upon the balls 26, and may be manually moved horizontally in any direction effectively without restriction in order to bring indexing recesses R (FIG. 5) on the plate into position beneath parts of the indexing-clamping mechanism C, as will be described.

The indexing-clamping mechanism C consists generally of a pair of turret members indicated generally at 27, which are at opposite sides of the box frame 18 and extend downwardly through the top plate 14; a plate clamping bar assembly indicated generally at 28; and an actuating mechanism, indicated generally at 29 (FIG. 3), which actuates both the indexing members in the turrets 27 and the clamping bar mechanism 28. Adjustment of the two turrets 27 is accomplished by a hand crank mechanism, indicated generally at 30.

Referring now particularly to FIGS. 1 and 2, the two turret assemblies 27 are identical, and accordingly only one will be described in detail. The turret assembly 27 has an annular collar 31 which is welded to the top plate 14 surrounding an opening 32 in said plate. Extending through said opening is an elongated guide sleeve 33 which has upper and lower annular recesses to receive split ring gears 34 and 35 which fit snugly in the recesses and are rotatable around the guide sleeve 33. Surmounting gear 34 is a turret head, indicated generally at 36, which is keyed to gear 34 so as to turn therewith. As best seen in FIG. 2, the turret head 36 is surmounted by four indexing arm brackets 37, and secured between the arm brackets 37 in spaced relationship to the top of guide sleeve 33 is a top rod guide plate 38. Carried on lower ring gear 35 is an upstanding spacer collar 39, and suspended from ring gear 35 is a bottom guide plate 40 which is similar to the upper plate 38.

Extending upwardly through the guide sleeve 33 are four indexing arm control rods 41 the upper ends of which extend through bores in the upper rod guide plate 38, and the lower ends 41*a* of which extend through registering bores in the bottom guide plate 40. Thus, if rotary motion is imparted simultaneously, ring gears 34 and 35, the turret head assembly 36 and the indexing arm actuating rods 41, together with the guide plates 38 and 40, will all turn together.

As best seen in FIG. 2, each of the brackets 37 of the turret head 36 has a pair of arms 37*a* and 37*b* which are disposed at right angles to each other. Thus, each arm 37*a* is parallel to arm 37*b* and a cross shaft between the parallel arms 37*a* and 37*b* may rockably support an indexing arm. So, the turret assembly seen at the left of FIG. 2 has at the top an indexing arm 42, at the bottom an indexing arm 43, at the left an indexing arm 44, and at the right so that its outer end overhangs the plate P, an indexing arm 45. Arms 42 and 43 are seen to be of different lengths, as are arms 44 and 45. These different arm lengths accommodate the machine to use with plates P of varying dimensions. The arms 42 and 43 are provided at their outer ends with fixed indexing fingers numbered, respectively, 46 and 47. At the outer ends of the indexing arms 44 and 45 are supporting elements numbered, respectively, 44*a* and 45*a*, which have elongated slots carrying movable indexing fingers numbered, respectively, 48 and 49. As seen in FIG. 1, the indexing finger 49 has guide pins 50 and is centered in the slot by a pair of opposed compression springs 51.

The right hand turret head in FIG. 2 has an indexing arm 52 which acts in cooperation with the lower indexing arm 43 of the left hand turret, a lower indexing arm 53 which acts in cooperation with the indexing arm 42 of the left hand turret, an indexing arm 54 which acts in cooperation with arm 44 of the left hand turret, and an indexing arm 55 which acts in cooperation with the arm 45 of the left hand turret. The hand crank mechanism 30 is for the purpose of rotating the two turret heads 36 so as to bring any desired pair of indexing arms into the working position which, in FIG. 2, is occupied by the indexing arms 45 and 55. Each pair of cooperating indexing arms on the two turret heads includes a fixed indexing finger and a movable indexing finger. Thus, when a plate P is placed upon the table B the two cooperating indexing fingers which are in the working position may be rested lightly upon the plate, and the plate may then be manually moved to bring its indexing recesses R and R1 into engagement with the two cooperating indexing fingers.

Figure 5:
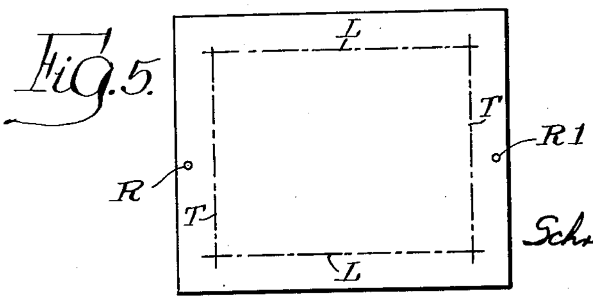
FIG. 5 is a plan view of an electrotype plate of the type which is adapted to be punched in the machine of the present invention.

As seen in FIG. 5, the recesses R and R1 in plate P are positioned on a line which is parallel to the longitudinal trim lines L for the plate. These trim lines are shown in broken lines in the drawings because they do not actually appear upon the plate. Recess R1 in FIG. 5 is also precisely located as to its distance longitudinal of the plate from the transverse trim line T. Given a first recess R1 which is precisely positioned with respect to both trim lines, and a second recess R which is on line from recess R1 which is parallel to the longitudinal trim lines, it is clear that any finishing work which is done upon the plate by indexing from the recesses R and R1 will necessarily produce exact positioning of the finished plate margins even though the trim lines themselves do not appear on the plate. Given identically positioned indexing recesses R and R1 in all plates of a color set, and indexing the finish machining with respect to such recesses on all the plates, the plates will necessarily be in perfect register.

It is not necessary to locate recess R an exact distance from recess R1; and the positioning and formation of the indexing recesses is simplified by not doing so. It is to compensate for minor differences in this distance that one indexing finger of each pair is movable on its indexing arm. Thus, the movable indexing finger may first be engaged with one indexing recess, and the fixed indexing finger may thereafter be engaged with the other indexing recess on the plate. The indexing fingers rest freely on the plate during the indexing operation, and thus may drop into the recesses when precise positioning of the plate is accomplished. The power transmission mechanism 29 for the indexing-clamping mechanism C is so arranged as to provide three positions for the indexing fingers: (1) an idle position in which the indexing fingers are held above and in spaced relation to a plate; (2) an indexing position in which the fingers rest lightly upon the plate surface; and (3) a clamping position in which the indexing fingers are pressed firmly against the surface of the plate to assist in clamping it on the table B. When the fingers are clamped against the plate P, the actuating mechanism 29 also presses the clamping bar 28 firmly against the plate P, so that the bar cooperates with the fingers in the clamping operation. The linkage through which the indexing-clamping actuator 29 operates will now be described in detail.

Power for operating the indexing-clamping mechanism C is provided by an air cylinder 56 which is seen in FIGS. 1 and 3 to be pivotally supported on a yoke 57 substantially at the center of the lower supporting shelf 11 of the frame A. A main actuating lever assembly 58 is mounted on a rock shaft 59 which extends from end to end of the rear of the frame. Assembly 58 has a center bar 58*a* which extends forwardly above the air cylinder 56, to the piston rod 56*a* of which it is pivotally connected at 56*b*. Aligned with turret members 27 the assembly 58 has a pair of side bars 61 which are parallel to the center bar 58*a*; and a cross bar 62 extends through the center bar and both side bars. Forward of the cross bar the side bars 61 have cam rollers 63 on which the actuating rods 41 for the operative indexing arms 45 and 55 are seated, while the actuating rods 41 for the inactive indexing arms of the two turrets are free of any contact with actuating assembly 58. Accordingly, when the device is in use only the active indexing arms are moved by operation of the air cylinder 56.

Extending upwardly from pivot 56*b* on center bar 58*a* is an adjustable link 64 the upper end of which is pivotally connected at 65 to a clamping bar lever 66 which is pivoted at 67 in the supporting frame 19 and carries at its forward end a clamping bar 68 of clamp mechanism 28, which overlies the rear marginal portion of plate P.

The indexing-clamping actuating mechanism 29 is so organized that when the piston rod 56*a* of air cylinder 56 is fully retracted, slotted engaging heads 41*b* at the upper ends of actuating rods 41 rest upon pins 41*c* which are mounted at the rear of the indexing arms, and the weight of the actuating rods 41 is enough to lift the indexing fingers out of contact with a plate P on the table B.

The air cylinder 56 is controlled by conventional solenoid valves which may be actuated by an operator through electric pushbutton switches in a switch box 69 at the front of top plate 14. The electric and hydraulic circuits will be described in detail hereafter; it being sufficient at the present time to state that a first electric pushbutton permits the piston rod 56*a* to be extended a sufficient distance to free the pins 41*c* from the weight of the actuating rods 41 so that the indexing fingers may rest lightly upon the plate P, and that after the operator has indexed the plate he may depress a second control button to extend the piston rod 56*a* an additional distance which elevates the actuating rods 41 to push upwardly on the pins 41*c* and clamp the indexing fingers in the recesses on the plate, while simultaneously the link 64 acting through the lever 66 presses the clamping bar 68 against the plate P. This causes the plate to be firmly held on the table B so that it cannot move during the subsequent punching operation.

Turning now to the punching mechanism D, it is seen in FIGS. 1 and 3 that a pair of punching guides 70 are mounted on brackets 19 overlying the clamping bar 68 to act as guides for a pair of punches 71 and 72. As best seen in FIG. 2, the punch 71 is considerably smaller than the punch 72, so that when a punched plate is placed in a milling machine it will necessarily be correctly positioned; and the two punches are adapted to reciprocate through marginal openings 68*a* in the clamping bar 68. In each of the punching guides 70 is a sliding rack member 73 having teeth engaged by complementary teeth on an actuating lever 74 which is pivoted on a shaft 75 in the guide 70. Lever 74 projects rearwardly from guide 70; and associated with each lever is an air cylinder 76 the piston rod 76*a* of which is pivotally connected at 77 with lever 74.

The control arrangement is such that movement of the indexing-clamping mechanism C to clamping position automatically actuates air cylinder 76 to depress the puches 71 and 72 to punch the plate P, and at the end of the punch stroke the air cylinders 76 automatically reverse to withdraw the punches, and at the same time the air cylinder 56 acts to release the clamping pressure and lift the indexing fingers to free the plate for removal from the table B. Beneatth the punches are removable slug buckets 71*a* and 72*a*.

The manual mechanism 30 for adjusting the indexing turrets 27 is seen in FIGS. 1 and 3 to be mounted on the brackets 16 and 17 which surmount the support channels 13 of the frame. As best seen in FIG. 3, an upright shaft 78 is supported on a thrust bearing 79 on the bracket 16 and extends through bearing bosses 80 and 81 on the top plate 14. Shaft 78 has an upper pinion 82 meshing with ring gear 34, a lower pinion 83 meshing with lower ring gear 35 and a bevel gear 84 which meshes with a bevel output gear 85 of a gear train 86 which may be driven by a hand wheel 87 at the front of the frame. A sprocket 88 immediately above the thrust bearing 79 carries a roller chain 89 which is also trained around a sprocket 90 on a second upright shaft 91 which is mounted on bracket 17 in the same way that shaft 78 is mounted on bracket 16. Shaft 91 has an upper pinion 92 meshing with ring gear 34 on the right hand turret 27, and a lower pinion 93 meshing with lower ring gear 35 on said turret; so that rotation of the hand wheel 87 may simultaneously rotate both of the indexing turrets 27 to bring any desired pair of indexing arms into working position overlying the plate margins.

In order to assure that the turrets will remain exactly in position once they have been set by the hand mechanism 30, the turrets are provided with positioning teeth 94 on each side, and adjacent each turret is a bracket 95 supporting a positioning air cylinder 96 the piston rod of which carries a guided positioning plunger 97 which wedges between the teeth 94 to lock the turrets in place when the piston rod of the air cylinder 96 is extended. Operation of the positioning air cylinder 96 is controlled by electric pushbutton control 98 so that the machine operator may release the brake plunger 97 preparatory to moving the indexing turrets, and may manually apply the brake before operating the indexing and punching mechanism after the indexing turrets have been set.

The controls for operating the mechanism of the present invention are illustrated diagrammatically in FIG. 4, and will be described in conjunction with a description of operation of the machine. The pushbutton control 69 has two normally open pushbutton switches 69*a* and 69*b* which control the ordinary operation of the machine, and a normally closed pushbutton 69*c* which serves as an emergency stop button to open all the machine circuits at any time in the machine cycle in case of malfunction. Closing pushbutton 69*a* energizes a relay CR1 which closes the circuit to solenoid valve V1 to activate air cylinder 56. As piston rod 56*a* is extended, actuating assembly 58 is elevated by rocking shaft 59 until an arm of assembly 58 strikes the plunger of limit switch LS1 which energizes a hydraulic valve H1 to stop cylinder operation. This establishes the indexing position of the actuating mechanism 29, in which the indexing fingers are resting lightly upon a plate P.

When the operator has indexed the plate to bring the recesses R and R1 into engagement with the indexing fingers he may press pushbutton 69*b* until a pilot light 99 adjacent one side of box frame 18 indicates the renewed operation of air cylinder 56 has raised the actuating assembly 58 a sufficient distance to close LS5 and complete the holding circuit, after which the operator may release pushbutton 69*b*. Air cylinder 56 then completes its stroke, forcing the indexing fingers and the clamping bar 68 into clamping engagement with the plate P. At the end of its stroke, lever 66 on which clamping plate 68 is mounted strikes the operating plunger of a limit switch LS2, which operates a valve V2 to start the operation of air cylinders 76 to move the punches 71 and 72 downwardly to punch plate P.

As seen by the broken line showing of lever 74 in FIG. 3, the lever strikes the actuating plunger of a limit switch LS3 which is mounted on a suitable bracket at the top of one of the punch guide members 70. Closing switch LS3 energizes a relay TDR1, thus opening valve V2 to retract the punches. TDR1 is set to remain open until after LS2 opens.

Substantially simultaneously with the closing of LS3 the punch lever 74 also operates the plunger of a limit switch LS4, closing said switch to energize CR3 which closes a self-holding circuit and thus energizes TDR2. The latter is set to open the holding circuit of CR1 just as the punches complete their retraction. Upon completion of punch retraction, punch lever 74 opens limit switch LS6 to open the holding circuit for CR3.

As the punch completes its retraction stroke, TDR2 opens the holding circuit of CR1, which deenergizes valve V1 to return air cylinder 56 to its original position, opening limit switches LS1 and LS5, and elevating the clamping bar and positioning plungers. The device is then ready for a new cycle of operation, commencing with insertion of a new plate P on the table B.

Pushbutton control 98, which is seen to the left of control box 69 in FIG. 1, operates through a valve V3 which controls the operation of positioning cylinder 96.

Figure 4:
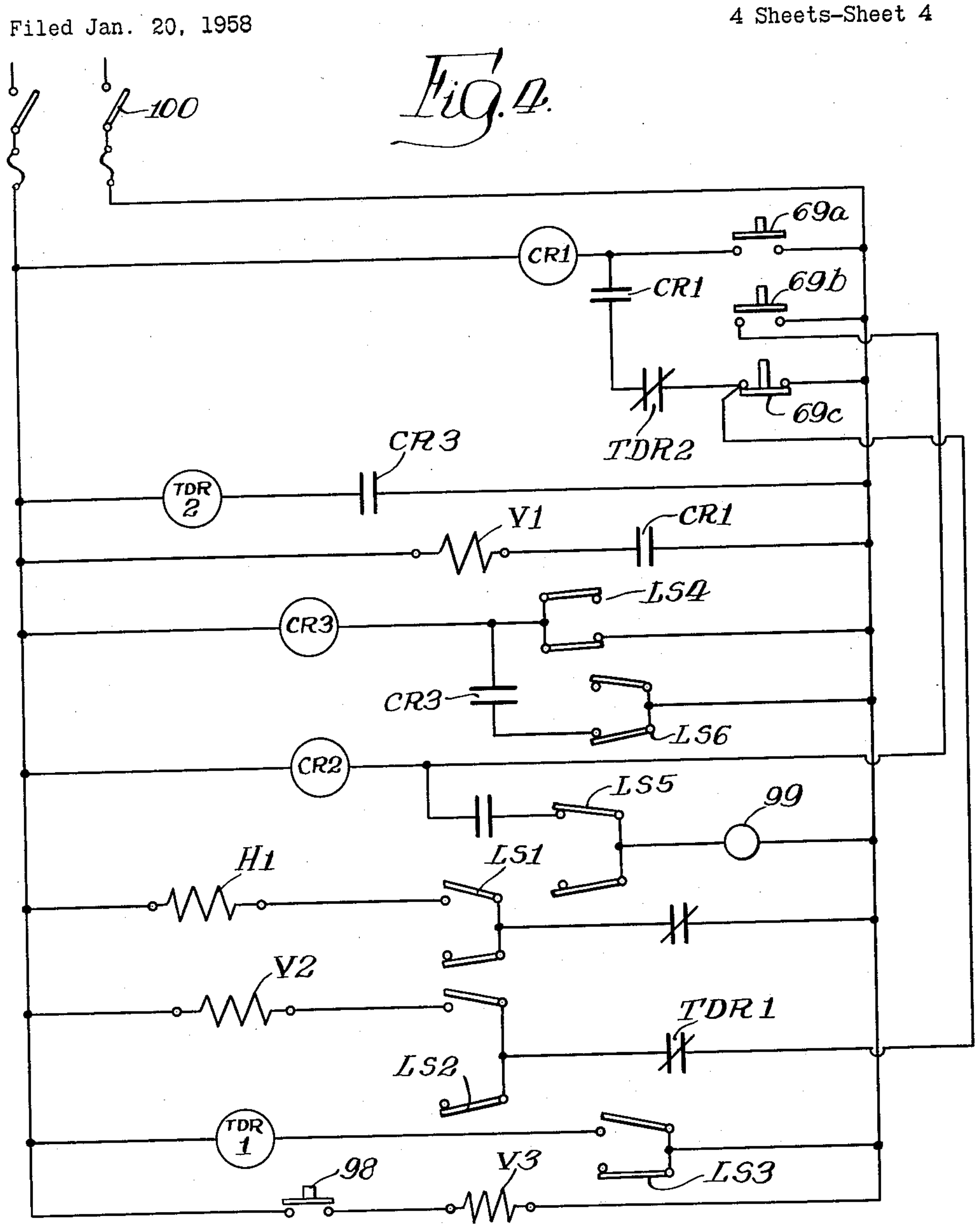
FIG. 4 is a wiring diagram for the control circuits.

As seen in FIG. 4, the circuits for the machine operation pass through the usual master switches 100 by means of which the entire control circuit for the machine may be selectively energized or deenergized from a source of electric current.

The term "electrotype plate" is used herein as a generic term covering either a complete electrotype plate, or the electrotype portion which is later secured to a backing plate to form a complete electrotype plate.

The foregoing detailed description is given for clearness of understanding only and no unnecessary limitations should be understood therefrom, as modifications will be obvious to those skilled in the art.

I claim:

1. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; a pair of pivoted indexing fingers at opposite sides of the frame which are adapted to engage simultaneously the indexing recesses in an electrotype plate on said table; means for resting said indexing fingers lightly on said plate to permit the plate to be moved to bring the recesses beneath the fingers and permit the fingers to drop into the recesses; and means for thereafter pressing said fingers firmly into the recesses to clamp the plate on the table.

2. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; a pair of movable indexing fingers on the frame which are adapted to engage simultaneously the indexing recesses in an electrotype plate on said table; means for resting said indexing fingers lightly on said plate to permit the plate to be moved to bring the recesses beneath the fingers and permit the fingers to drop into the recesses; and a clamping bar on said frame overlying a margin of the plate, said clamping bar having a pair of holes through which plate punches may reciprocate normal to the surface of a plate on the table, and said bar being movable to clamp the plate on the table.

3. In apparatus for punching machining holes in an electrotype plate which has a pair of indexing recesses in predetermined positions with respect to its center line and trim lines, in combination: a frame; a horizontal plate table on said frame, said table having a plurality of universally rotatable balls on its upper surface upon which an electrotype plate may rest for effectively unrestricted horizontal movement; a pair of pivoted indexing fingers on opposite sides of the frame which are adapted to engage simultaneously the indexing recesses in an electrotype plate on said table; means for resting said indexing fingers lightly on said plate to permit the plate to be moved to bring the recesses beneath the fingers and permit the fingers to drop into the recesses; and a clamping bar on said frame which overlies a marginal portion of a plate between the indexing fingers, said clamping bar having a pair of holes through which plate punches may reciprocate normal to the surface of a plate on the table, and said clamping bar being movable to clamp the plate on the table.

4. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; a pair of movable indexing fingers on the frame at opposite sides of the table which are adapted to simultaneously engage the indexing recesses in an electrotype plate on said table; a clamping bar on said frame overlying a margin of the plate between said indexing fingers; and means for sequentially resting said indexing fingers lightly on said plate to permit the plate to be moved to bring the recesses beneath the fingers and permit the fingers to drop into the recesses, and for thereafter clamping the fingers and the clamping bar against the plate to lock it on the table.

5. In apparatus for punching machining holes in an electrotype plate which has a pair of indexing recesses in predetermined positions with respect to its center line and trim lines, in combination: a frame; a horizontal plate table on said frame on which a plate may rest; a pair of turrets on opposite sides of the frame, each said turret having a plurality of indexing fingers arranged on radial arms one of which may overlie a marginal portion of an electrotype plate on the table, said indexing fingers on each turret being paired with complementary indexing fingers on the other turret; means for simultaneously rotating said turrets to bring a selected pair of fingers to positions overlying the marginal portions of the plate; means for resting said selected pair of indexing fingers lightly on said plate to permit the plate to be moved to bring the recesses into engagement with the fingers; and movable means on the frame for clamping said plate on the table.

6. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; a pair of arm supports flanking opposite sides of said table; a pivoted indexing arm on each of said arm supports; an indexing finger on each arm adapted to overlie a marginal portion of an electrotype plate on said table; arm operating means on the frame operatively connected to said arms, said operating means having release, indexing and clamping positions with reference to said arms, said fingers being respectively free of, resting lightly on, and clamping a plate on said table in said respective positions; means for moving said operating means sequentially from said release position to said indexing position and then to said clamping position; a clamping bar on said frame overlying a marginal portion of the plate; and means for moving said clamping bar to a clamping position simultaneously with the movement of said arms to clamping position.

7. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; combined indexing and clamping means on the frame adapted to engage simultaneously the indexing recesses in an electrotype plate on the plate; means for resting said indexing means lightly on the plate to permit movement of the plate on the table to bring the indexing recesses beneath the indexing means and permit said indexing means to drop into the recesses; and means for thereafter pressing said indexing means firmly into the recesses to clamp the plate on the table.

8. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; a pair of indexing fingers on the frame which are adapted to engage simultaneously the indexing recesses in an electrotype plate on said table, one of said fingers occupying a fixed position and the other being mounted between opposed springs for movement only along a straight line projected through said pair of fingers; means for resting said indexing fingers lightly on said plate to permit the plate to be moved to bring the recesses beneath the fingers and permit the fingers to drop into the recesses; and means on the frame for clamping the plate on the table.

9. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; indexing means on the frame which are adapted to engage simultaneously the indexing recesses in an electrotype plate on said table; clamping means on the frame overlying the plate; a fluid cylinder operatively connected with said indexing and said clamping means; and control means for said fluid cylinder including an indexing control adapted to actuate said cylinder to permit the indexing means to rest lightly on a plate on the table so that horizontal movement of the plate on the table to bring the recesses beneath the indexing means permits the indexing means to drop into the recesses, and a clamping control to thereafter clamp said indexing means and clamping means against the plate.

10. In apparatus for punching machining holes in an electrotype plate which has a pair of indexing recesses in predetermined positions with respect to its center line and trim lines, in combination: a frame; a horizontal plate table on said frame on which a plate may rest for effectively unrestricted horizontal movement; indexing means on the frame adapted to engage simultaneously the indexing recesses in an electrotype plate on the table; clamping means on the frame overlying a portion of the plate; and means for sequentially resting said indexing means lightly on said plate to permit the plate to be moved to bring the recesses beneath said indexing means and permit said indexing means to drop into the recesses, and for thereafter clamping both the indexing means and the clamping means firmly against the plate to lock it on the table.

References Cited in the file of this patent

UNITED STATES PATENTS

| | | |
|---|---|---|
| 1,033,491 | Tedell | July 23, 1912 |
| 1,307,379 | Segal | June 24, 1919 |
| 1,815,699 | Bonsor | July 21, 1931 |
| 2,366,443 | Deans | Jan. 2, 1945 |
| 2,533,413 | Williams | Dec. 12, 1950 |
| 2,549,606 | Hudson | Apr. 17, 1951 |
| 2,559,369 | Phillips | July 3, 1951 |
| 2,561,819 | Porter et al. | July 24, 1951 |
| 2,568,905 | Wiehsner | Sept. 25, 1951 |
| 2,766,825 | Pater | Oct. 16, 1956 |
| 2,785,747 | Le Gate | Mar. 19, 1957 |
| 2,955,820 | Berg | Oct. 11, 1960 |